United States Patent Office 3,300,965
Patented Jan. 31, 1967

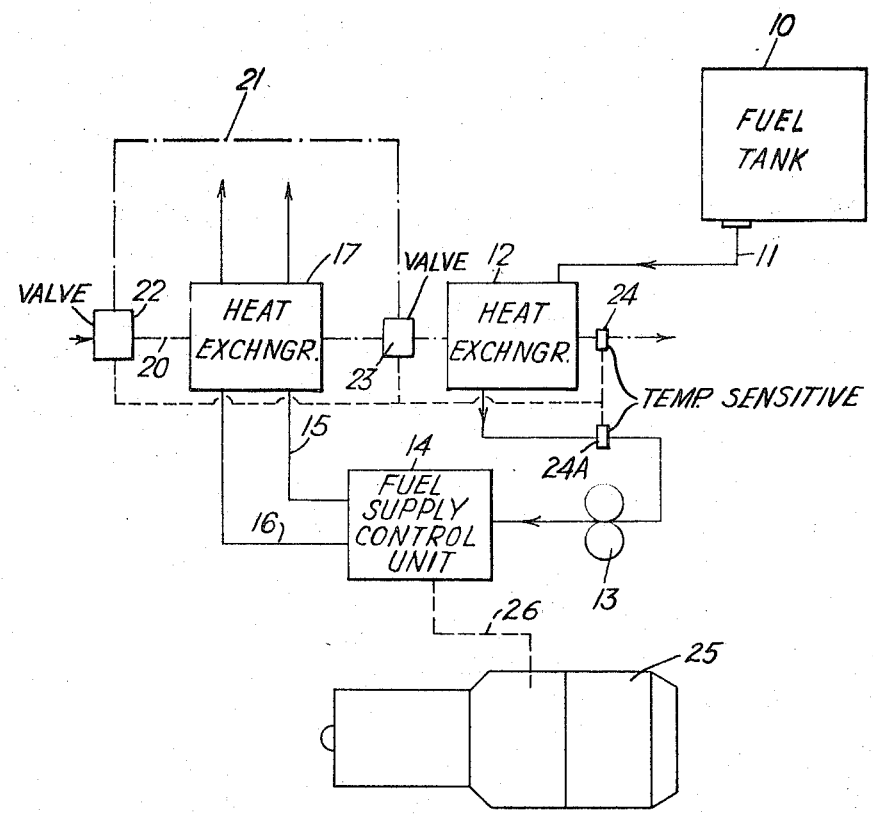

3,300,965
GAS TURBINE ENGINE FUEL HEATING AND OIL COOLING SYSTEM
William Sherlaw, Mapperley, and George Kenneth Hensman, Allestree, England, assignors to Rolls-Royce Limited, Derby, England, a British company
Filed Mar. 29, 1965, Ser. No. 443,531
Claims priority, application Great Britain, May 8, 1964, 19,405/64
5 Claims. (Cl. 60—39.08)

This invention concerns a gas turbine engine fuel heating and oil cooling system.

According to the present invention, there is provided a gas turbine engine fuel heating and oil cooling system comprising first and second heat exchangers; a fuel supply control unit for controlling the supply of fuel to the engine in accordance with one or more engine variables; conduit means for passing fuel successively through the first heat exchanger, the fuel supply control unit and the second heat exchanger; and ducting for passing engine oil as desired through at least one selected heat exchanger, the said ducting comprising a by-pass passage which by-passes the second heat exchanger and valve means controlling flow through the said by-pass passage, the engine oil passing through the said first heat exchanger in all positions of the said valve means.

The said valve means may be controlled by temperature sensitive means which are arranged to respond to the temperature of the engine oil and/or of the fuel at some predetermined point or points.

The ducting is preferably such that the engine oil passes through, or by-passes, the second heat exchanger prior to flowing through the first heat exchanger.

The temperature responsive means may be arranged to respond to the temperature of the engine oil passing through the outlet of the first heat exchanger.

The invention also comprises a gas turbine engine provided with a fuel heating and oil cooling system as set forth above.

The invention is illustrated, merely by way of example, in the accompanying diagrammatic drawing, which shows a gas turbine engine fuel heating and oil cooling system according to the present invention.

Referring to the drawing, fuel from a fuel tank 10 of a gas turbine engine 25 may flow through a conduit 11 and via a heat exchanger 12 and a pump 13 to a fuel supply control unit 14 to which it is connected to the engine 25 by an input signal 26. The fuel supply control unit 14 controls the supply of fuel to the engine in accordance with one or more engine variables such as engine rotational speed and a compressor pressure or pressures.

The fuel leaving the fuel supply control unit 14 passes through one or both of conduits 15, 16 which respectively extend to pilot and to main burners (not shown) of the engine, each of the conduits 15, 16 passing through a heat exchanger 17.

An oil duct 20 is provided to allow oil which has been used in lubricating the engine, and which has thus been heated, to pass successively through the heat exchangers 17, 12.

A by-pass passage 21 communicates with the duct 20 on both the upstream and the downstream sides of the heat exchanger 17 so that any engine oil passing through the by-pass passage 21 by-passes the heat exchanger 17.

Flow through the by-pass passage 21 is controlled either by a valve 22 on the upstream side of the heat exchanger 17 or by a valve 23 on the downstream side thereof. The valve 22 or the valve 23 is settable so as to cause some or all of the engine oil to by-pass the heat exchanger 17.

The valve 22 or the valve 23 may be adjusted manually or may be controlled by a temperature sensitive member 24 (e.g. that sold under the trademark Vernatherm), which is arranged to respond to the temperature of the engine oil passing through the outlet of the heat exchanger 12.

In operation, under low inlet fuel temperature conditions, the valve 22 or the valve 23 is arranged to cause the engine oil to flow through the by-pass passage 21 so as to by-pass the heat exchanger 17. As a result, the engine oil flows only through the heat exchanger 12, whereby to maximise the temperature of the fuel reaching the fuel supply control unit 14.

At higher inlet fuel temperatures, the temperature sensitive members 24 and 24A causes the valve 22 or the valve 23 to pass a proportion of the engine oil through the heat exchanger 17 such that the temperature of the fuel leaving the heat exchanger 12 does not exceed a predetermined value such, for example, as 80° C. The temperature sensitive member 24 may also be arranged to ensure that the oil temperature on the outlet side of the heat exchanger 12 does not exceed a predetermined temperature such, for example, as 105° C.

We claim:

1. A gas turbine engine fuel heating and oil cooling system comprising first and second heat exchangers; a fuel supply control unit for controlling a supply of fuel to the engine in accordance with at least one engine variable; conduit means for passing fuel successively through the first heat exchanger, the fuel supply control unit, and the second heat exchanger; and ducting for passing engine oil as desired through at least one selected heat exchanger, the said ducting comprising a by-pass passage which by-passes the second heat exchanger and valve means controlling flow through the said by-pass passage, the engine oil passing through the said first heat exchanger in all positions of the said valve means.

2. A system as claimed in claim 1 wherein there is a temperature sensitive means which is arranged to control the valve means, the engine oil passing through the second heat exchanger prior to flowing through the first heat exchanger.

3. A system as claimed in claim 2 wherein said temperature sensitive means is arranged to control the valve means and to respond to the temperature of the fuel at a predetermined point.

4. A system as claimed in claim 2 wherein said temperature sensitive means is arranged to control the valve means and/or respond to the temperature of the engine oil at a predetermined point.

5. A system as claimed in claim 4 wherein the temperature responsive means is arranged to respond to the temperature of the engine oil passing through the outlet of the first heat exchanger.

References Cited by the Examiner

UNITED STATES PATENTS

| | | | |
|---|---|---|---|
| 2,731,239 | 1/1956 | Andersen | 60—39.08 |
| 2,865,580 | 12/1958 | Marshall | 60—39.08 |
| 2,996,883 | 8/1961 | Fortmann | 60—39.28 |
| 3,080,716 | 3/1963 | Cummings et al. | 60—39.08 |
| 3,147,823 | 9/1964 | Killackey et al. | 60—39.08 |

FOREIGN PATENTS

| | | |
|---|---|---|
| 956,824 | 1/1957 | Germany. |
| 253,233 | 6/1926 | Great Britain. |

CARLTON R. CROYLE, *Primary Examiner.*